United States Patent
Namie et al.

(10) Patent No.: US 8,223,171 B2
(45) Date of Patent: Jul. 17, 2012

(54) IMAGE PROCESSING APPARATUS AND IMAGE DISPLAY APPARATUS

(75) Inventors: Kenji Namie, Kanagawa (JP); Kenji Kameyama, Kanagawa (JP); Toshiharu Murai, Kanagawa (JP); Masaki Ninomiya, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1341 days.

(21) Appl. No.: 11/855,456

(22) Filed: Sep. 14, 2007

(65) Prior Publication Data

US 2008/0068505 A1    Mar. 20, 2008

(30) Foreign Application Priority Data

Sep. 15, 2006   (JP) .................................. 2006-250365

(51) Int. Cl.
G09G 5/00 (2006.01)
G06F 12/02 (2006.01)
(52) U.S. Cl. .......................... 345/636; 345/544; 345/629
(58) Field of Classification Search .................. 345/530, 345/544, 545, 629, 636
See application file for complete search history.

(56) References Cited

U.S. PATENT DOCUMENTS

| | | | | |
|---|---|---|---|---|
| 4,317,114 A | * | 2/1982 | Walker | 345/634 |
| 4,965,670 A | * | 10/1990 | Klinefelter | 348/586 |
| 5,469,541 A | * | 11/1995 | Kingman et al. | 345/545 |
| 7,446,733 B1 | * | 11/2008 | Hirimai | 345/32 |
| 2006/0013499 A1 | | 1/2006 | Namie et al. | |

FOREIGN PATENT DOCUMENTS

JP    2003-302952    10/2003
JP    2005-189546    7/2005

* cited by examiner

Primary Examiner — Joni Hsu
(74) Attorney, Agent, or Firm — Oblon, Spivak, McClelland, Maier & Neustadt, L.L.P.

(57) ABSTRACT

An image processing apparatus includes a storage unit storing the OSD image data corresponding to plural subframes; a load storage unit loading and storing the OSD image data corresponding to the plural subframes; a reading unit reading out plural subframes of the OSD image data in parallel; and a controlling unit controlling to load in parallel the plural sunframes of the OSD image data into the load storage unit and to read out in parallel from the load storage unit and transmits the OSD image data to a combining unit to combine the OSD image data with the corresponding image data.

5 Claims, 8 Drawing Sheets

FIG.2A

1FRAME OSD IMAGE DATA

FIG.2B

SF1 OSD IMAGE DATA

FIG.2C

SF2 OSD IMAGE DATA

FIG.2D

SF3 OSD IMAGE DATA

FIG.2E

SF4 OSD IMAGE DATA

| ADDRESS 1 | SF1 (8 BIT) | SF2 (8 BIT) | SF3 (8 BIT) | SF4 (8 BIT) | ... |
|---|---|---|---|---|---|
| ADDRESS 2 | SF1 (8 BIT) | SF2 (8 BIT) | SF3 (8 BIT) | SF4 (8 BIT) | ... |

FIG.6

IMAGE PROCESSING APPARATUS AND IMAGE DISPLAY APPARATUS

BACKGROUND OF THE INVENTION

1. Field of the Invention

The present invention generally relates to an electronic display apparatus such as a projection display and a head mount display, and particularly to an image processing apparatus capable of dividing a single frame of image data into plural subframes of image data and combining the image data with OSD image data so as to provide a higher resolution display than the resolution of the image display device by time-division display, and an image display apparatus capable of displaying the above display.

2. Description of the Related Art

Recently, with the significant improvement in performance of information processing apparatuses, the resolution of the displayed images has been increasing. Accordingly, the demand of higher resolution in the image display apparatuses such as projectors has been increasing. As a method of increasing the resolution of images, there is a method where the image data of one frame is divided into plural subframes of image data, and the plural subframes are displayed by time-division display so as to provide a higher resolution than that of the image display device of the image display apparatus. Together with this, there is another demand that, in image display apparatuses such as projectors, previously stored data, such as tables, characters, and figures are often combined with the original image data to display the combined data upon, for example, an instruction of a user. The data, such as tables, characters, and figures, used to be combined with original image data are called OSD (On Screen Display) image data.

In the past, as an image processing method of not only dividing a single frame of image data into plural subframes of image data and displaying by time-division display to provide a higher resolution than that of the image display device but also combining the image data with OSD image data, there are, for example, an image processing method of combining original image data with OSD image data first, and dividing the combined image data into plural subframes, as described in Patent Document 1; and a method of dividing original image data into plural subframes, and followed by performing image processing, as described in Patent Document 2.

Patent Document 1: Japanese Patent Application Publication No. 2003-302952.

Patent Document 2: Japanese Patent Application Publication No. 2005-189546.

However, in the method of the Patent Document 1, since the amount of display image data to be image-processed will be increased as the resolution is increased, a very fast processing performance will be required to achieve real-time image processing, thereby causing a case where real-time image processing cannot be achieved. Even when such a very fast processing performance is achieved, the cost of parts required to achieve such high performance is expensive, thereby disadvantageously increasing the cost of the entire apparatus. On the other hand, in the method of the Patent Document 2, a higher processing performance is partially achieved by providing the same number of units as the number of subframes for some of the units to perform OSD processing in parallel. However, in a process in which data are loaded from the storage unit to the load storage unit, since the pixel data of the OSD data are transferred one by one, the processing performance in this process will not be increased, and the same problems as in the method according to Patent Document 1 occurs as the resolution of the images is increased.

SUMMARY OF THE INVENTION

The present invention is made in light of the above problems, and may increase the loading speed of the OSD image data and reduce the cost by decreasing the capacity of parts such as a load storage unit of an image processing apparatus that combines the image data divided into plural subframes with the corresponding OSD image data.

According to one aspect of the present invention, there is provided an image processing apparatus including a combining unit combining each of plural subframes of original image data, each divided from one frame, with a corresponding one of plural subframes of OSD image data; a storage unit storing plural subframes of the OSD image data, each of the plural subframes being divided in the same manner as the original image data are divided; a load storage unit loading and storing the plural subframes of the OSD image data stored in the storage unit; a reading unit reading out in parallel the plural subframes of the OSD image data stored in the storage unit; and a controlling unit controlling to load the plural subframes of the OSD image data read out in parallel from the storage unit so as to write the OSD image data in parallel in the load storage unit and to read out in parallel the OSD image data from the load storage unit so as to transmit the OSD image data to the combining unit.

According to another aspect of the present invention, there is provided an image processing apparatus in which the reading unit reads out at least two subframes of the OSD image data in parallel from the storage unit.

According to still another aspect of the present invention, there is provided an image processing apparatus in which the storage capacity per address in the storage unit is equal to or larger than double the data length of one pixel, and accordingly two or more subframes of the image data are stored according to a prescribed sequence at a single address of the storage unit; and the reading unit reads out the OSD image data in parallel with respect to each address from the storage unit.

According to still another aspect of the present invention, there is provided an image processing apparatus in which the storage capacity per address of the load storage unit is equal to or greater than double the data length of one pixel; and the controlling unit writes at least two subframes of pixel data at a single address of the load storage unit in parallel and reads out the pixel data in parallel with respect to each address.

According to still another aspect of the present invention, there is provided an image processing apparatus including a combining unit combining each of plural subframes of original image data, each divided from one frame, with a corresponding one of plural subframes of OSD image data; a storage unit storing common OSD image data commonly used in at least two subframes; a load storage unit loading and storing the common OSD image data stored in the storage unit; a reading unit reading out the common OSD image data stored in the storage unit; and a controlling unit controlling to load the common OSD image data read out from the storage unit so as to write the common OSD image data in the load storage unit and to read out the common OSD image data from the load storage unit so as to transmit the common OSD image data to the combining unit, in which the combining unit combines the common OSD image data with each subframe of the original image data.

According to still another aspect of the present invention, there is provided an image processing apparatus in which the storage unit stores the common OSD image data used for all of the subframes; and the combining unit combines the common OSD image data read out from the load storage unit with the corresponding subframes of the original image data simultaneously.

According to still another aspect of the present invention, there is provided an image display apparatus including an image display device, having a two-dimensional array of pixels and modulating transmitted light or reflected light passing through the image display device by changing the electronic signal input to each of the pixels, the electronic signal being updated at least with respect to each scanning line; a light source illuminating the image display device; a deflecting unit deflecting the light modulated by the image display device; and an optical system projecting an image, wherein one frame of image data is divided into plural subframes of the image data and each subframe of the image data is deflected by the deflecting unit so as to be displayed at a corresponding position of the image display device by time-division display, the image display apparatus further including the above-mentioned image processing apparatus.

The primary advantages of the present invention are listed as follows:

(1): The OSD image data with respect to each of divided subframes are previously stored in the storage unit, and thus the workload of loading process of the OSD image data to the load storage unit can be reduced and the loading speed of the OSD image data can be increased.

(2): Each part of the storing unit for storing the corresponding each of the subframes are provided, and thus most parts of the OSD processing can be performed in parallel and the speed of the OSD processing can be increased.

(3): Since the data format of the OSD image data stored in the storage unit is arranged so that one data length of one pixel is multiplied by the number of the divided subframes, is a unit to be processed at a time, and the pixel data of each subframe are arranged in the predetermined order in one unit, the configuration can be simplified and accordingly the cost can be reduced.

(4) Since the data format stored in one address of the load storage unit is set several times longer than the data length of the data for one subframe, it is possible to transmit the data of all subframes to the combining unit simultaneously by wiring the same number of wires as the number of subframes and to simplify the configuration and reduce the cost.

(5) Since the same OSD image data are used for, for example, each subframe and thus the capacity of storage can be reduced, it is possible to reduce the cost and to simplify the control of the load storage unit and the method of the data transmission from the load storage unit to the combining unit, thereby reducing the number of parts and the cost and making it possible to perform the OSD processing in lower cost.

(6) Since an image processing apparatus that can perform the OSD processing faster and at lower cost can be used in an image display apparatus, the image display apparatus can perform the OSD processing faster and at lower cost.

DETAILED DESCRIPTION OF THE PREFERRED EMBODIMENTS

Embodiments of the present invention are described below with reference to the accompanying drawings.

Example 1

Figure 1:
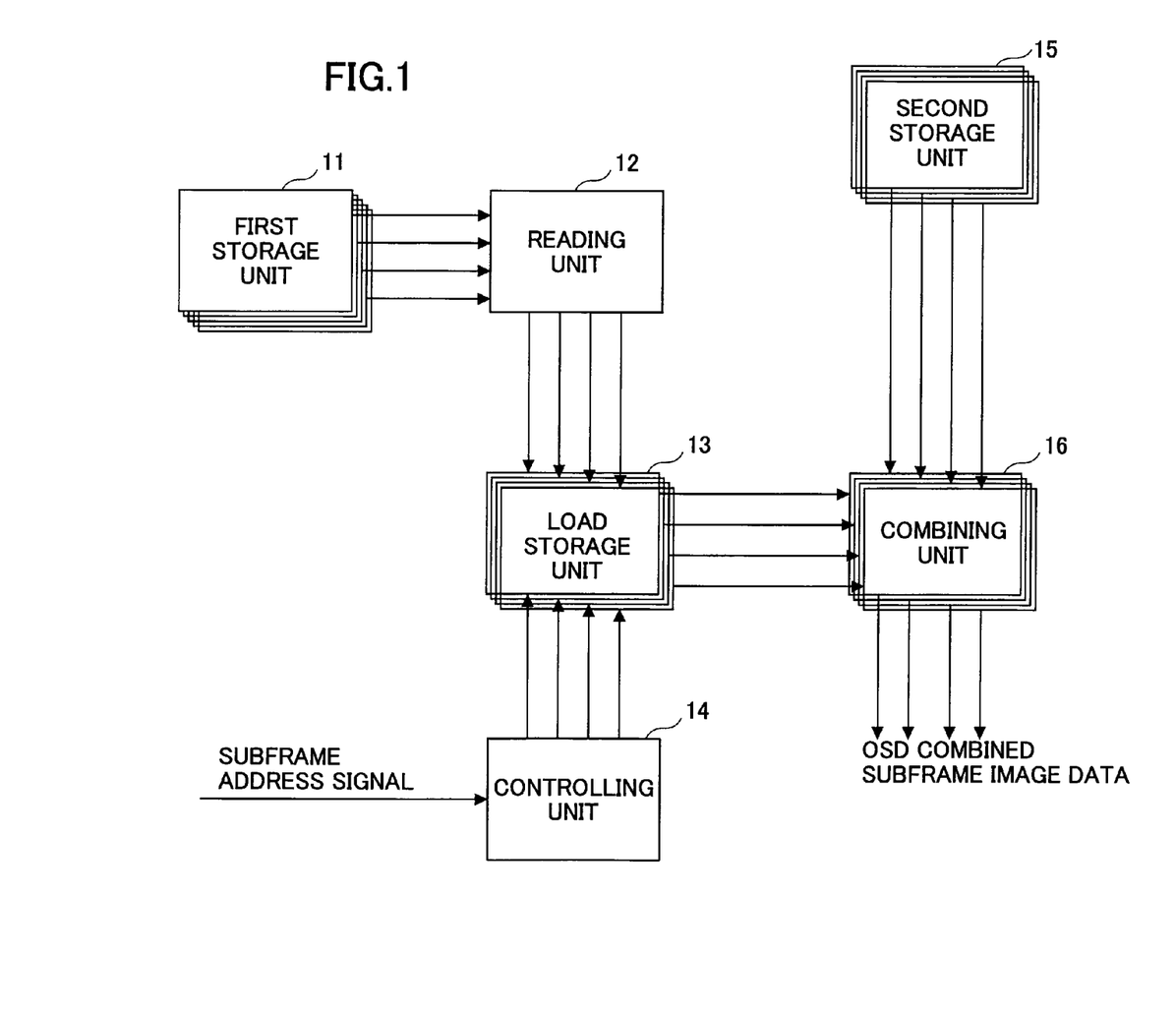
FIG. 1 is a configuration block diagram of an image processing apparatus according to a first embodiment of the present invention.
Figure 2A:
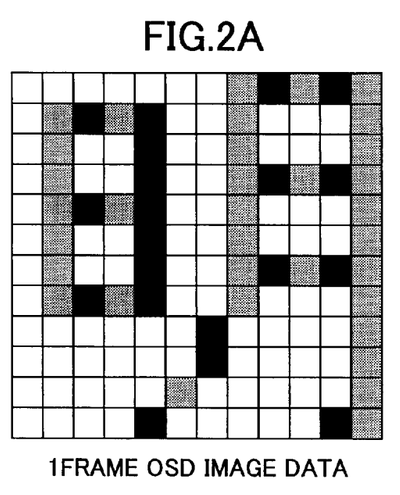
FIGS. 2A through 2E are drawings showing one example of OSD image data divided into four subframes generated from one frame.
Figure 2B:
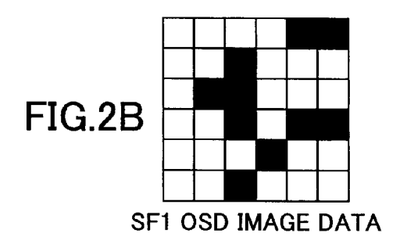
Figure 2C:
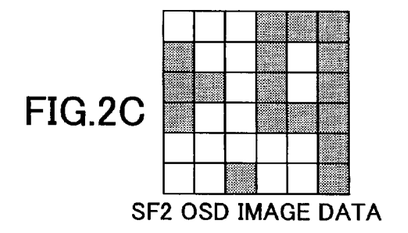
Figure 2D:
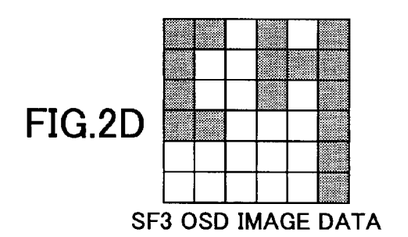
Figure 2E:
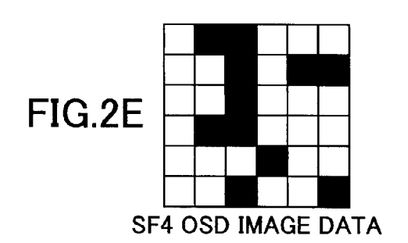

FIG. 1 is a configuration block diagram of an image processing apparatus according to a first embodiment of the present invention. As an example in this embodiment, original image data of one frame are divided into two in both the horizontal and vertical directions to create four subframes. The OSD image data of one frame are also divided in the same manner as the original image data to create four subframes. Then, the original image data in the subframes are combined with the corresponding OSD image data in the subframes. FIG. 2A shows the OSD image data of one frame. FIGS. 2B through 2E show the OSD image data of subframe 1 through 4, respectively. When each of the 2×2 pixels is divided into four pixels numbered 1, 2, 3 and 4 as shown in FIG. 2, the subframes 1 through 4 (SF1 through SF4) correspond to the sets of pixel data 1 through 4, respectively, of the OSD image data in FIG. 2A.

In FIG. 1, a first storage unit 11 consists of four storage parts and each of the storage parts stores the divided OSD image data previously. Actually, there may be several sets of such first storage units 11 so that each storage unit stores each OSD image data such as characters, figures, and tables into subframes of the storage unit. A device, such as various types of ROM, RAM, HDD, capable of storing image data is generally used for the first storage unit 11. A second storage unit 15 also consists of four storage parts and each of the storage parts stores the original image data which is one of the divided four subframes. For the second storage unit, a RAM is typically used. Needless to say but the storage capacity of the second storage unit 15 is greater than that of the first storage unit 11.

Figure 3A:
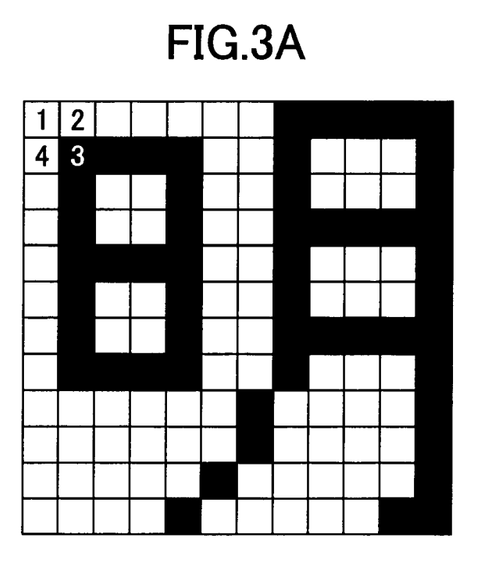
FIGS. 3A and 3B are drawings illustrating the combination of original image data and OSD image data.
Figure 3B:
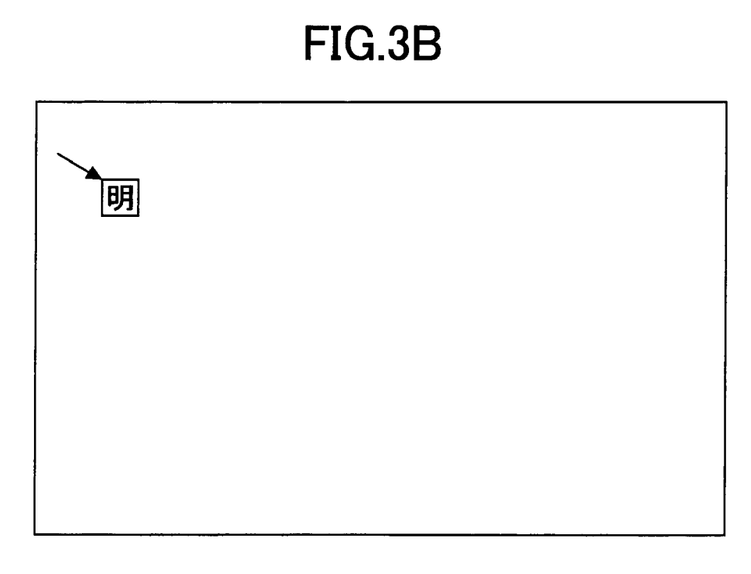

FIGS. 3A and 3b shows an example how the OSD image data are combined with the original image data. When the OSD image data divided into four subframes are combined with the original data, the OSD data of subframe 1 shown in FIG. 3A are always set to one of the drawing starting coordinates which are the starting positions of drawing of each division unit. In this example, since one frame is divided into 2×2, the division unit is 2×2.

A reading unit 12, which is typically a CPU or the like, reads out in parallel the OSD image data to be combined with original image data from each storage part of the first storage unit 11 (for example, reads out from four subframes simultaneously or from two subframes twice) when necessary, for example, due to a user's instruction. The reading unit 12 controls a controlling unit 14 to load each of the OSD image data to a prescribed address of a load storage unit 13 corresponding to the each subframe and to store the OSD image data corresponding to the each subframe in the storage part. As the load storage unit 13, a device capable of reading and writing data such as a RAM is used.

Since each drawing starting coordinate of the OSD image data are set to the starting positions of the drawing of each division unit, the OSD image data in the same division unit are stored in the same position of each storage part of the first storage unit 11. Namely, since the OSD image data in the same division unit can be saved in the same address of each subframe, it is possible to read out those OSD image data simultaneously by using the same address signal, thereby increasing the processing speed of reading out OSD image data. Further, since each storage part of the first storage unit 11 stores the OSD image data of the corresponding subframe and each storage part of the load storage unit 13 also loads the OSD image data of the corresponding subframe, each storage part of the first storage unit 11 has a one-on-one relationship with each storage part of the load storage unit 13 and it is not necessary to provide dividing unit to divide data for each subframe, thereby simplifying the configuration block of the image processing apparatus. As described, according to this embodiment, the first storage unit 11, the second storage unit 15, the load storage unit 13, and a combining unit 16 have their plural storage parts so that each storage part stores the data of each subframe. Therefore, it is necessary for each of the above units to have the same number of storage parts as the number of subframes.

The controlling unit 14, when the OSD image data corresponding to each subframe are loaded into the load storage unit 13, receives the address signal for a subframe under the control of the reading unit 12 and operates the load storage unit 13 to control the address. Namely, the controlling unit 14 loads the OSD image data to the address corresponding to the subframe of the original data.

The OSD image data, corresponding to each subframe and stored in the load storage unit 13, are transmitted to the storage parts corresponding to the subframe of the combining unit 16 under the control of the controlling unit 13 again and are combined with the original image data of each subframe transmitted from the second storage unit 15 to the combining unit 16.

According to the embodiment of the present invention, when the OSD image data are previously stored in the first storage unit 11 in the same manner as the original image data are divided into subframes, since the subframes where the OSD image data are stored and the subframes where the original data to be combined with the OSD data are stored can be determined, all the OSD processing can be performed in parallel, thereby increasing the OSD processing speed and decreasing the cost.

Example 2

Figure 4:
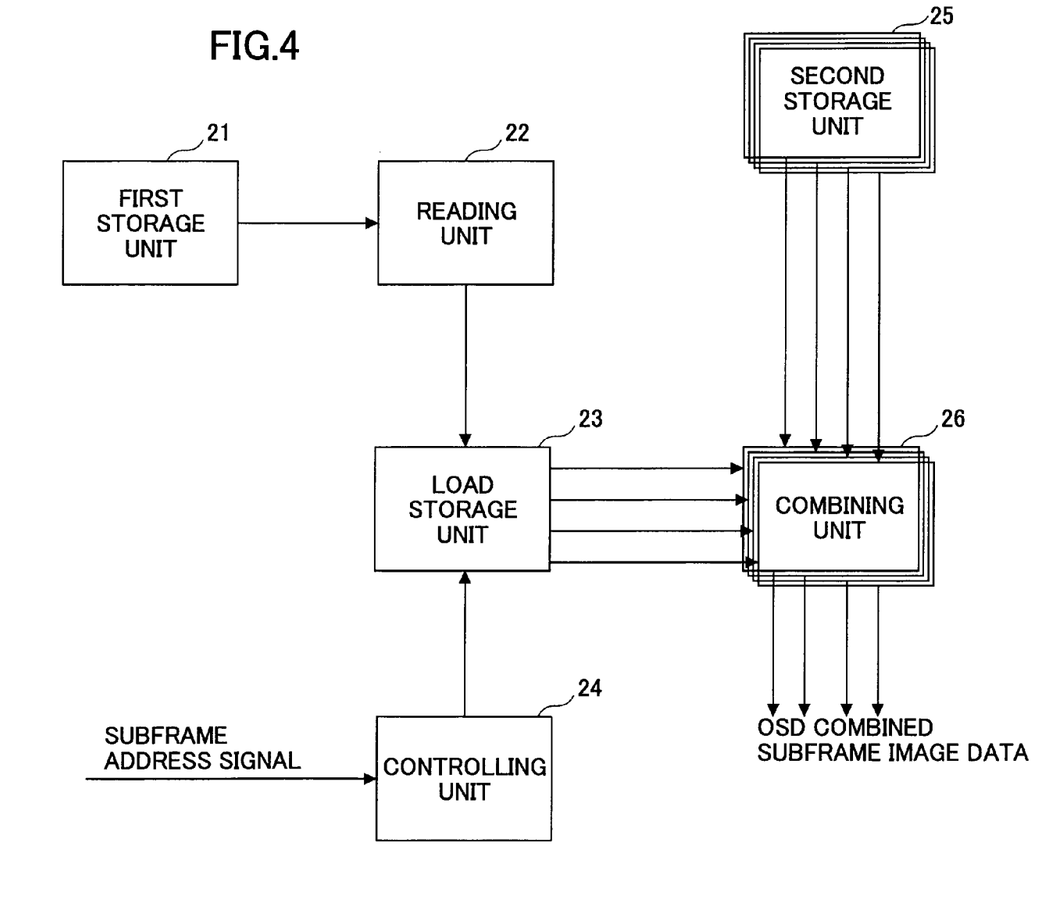
FIG. 4 is a configuration block diagram of an image processing apparatus according to a second embodiment of the present invention.

FIG. 4 is a configuration block diagram of an image processing apparatus according to a second embodiment of the present invention. In this embodiment, the whole configuration is basically the same as that in FIG. 1, but the data format of the OSD data stored or loaded into the first storage unit 21 and the load storage unit 23 is different from that in the first embodiment. Because of this feature, as described in detail below, the first storage units 21 and the loading units 23 don't have to have the configuration to respond to plural subframes, thereby simplifying the configuration.

Figure 5:
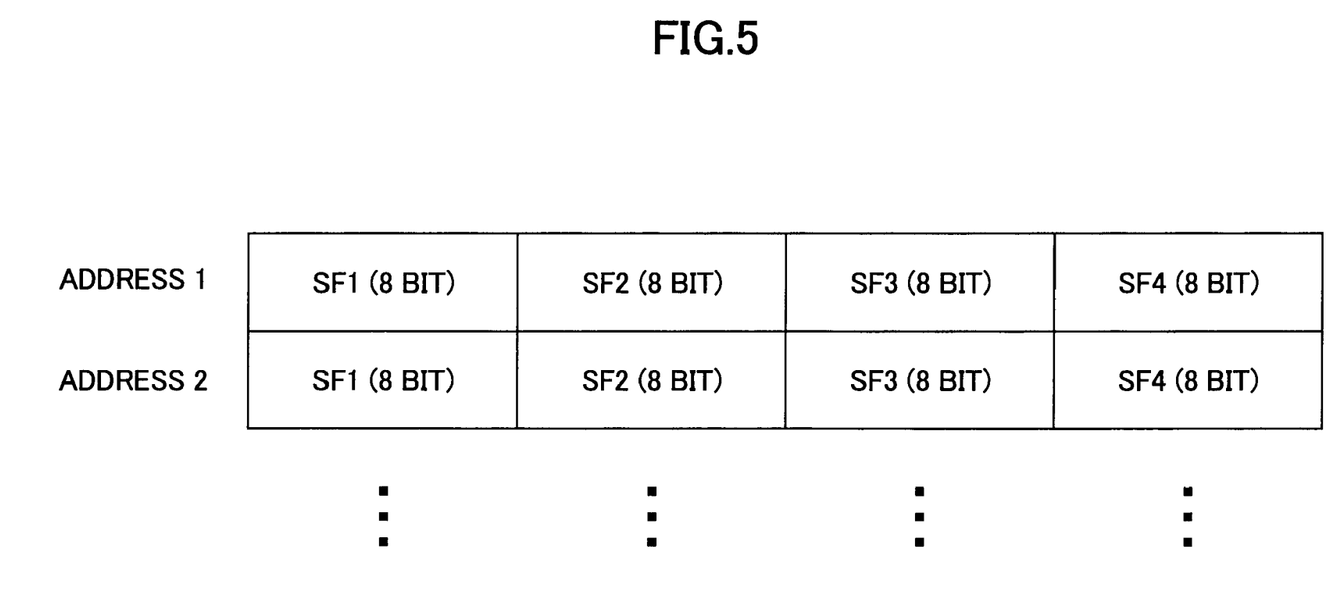
FIG. 5 is a drawing showing one example of data format of the OSD image data stored in the storage unit used in the second embodiment of the present invention.

FIG. 5 shows one example of the data format of the OSD image data stored in the first storage unit 21 and the load storage unit 23. In this example, one frame is divided into four subframes (SF1 through SF4). It is possible that the data length of one address in the storage units is set to two times or more the data length of one pixel data. In this example, one pixel data are 8-bit data and the OSD data of four subframes are stored at one address according to a prescribed order from SF1 through SF4. In address 1, the first 2×2 pixel data of the OSD image data of one frame are stored in the order from SF1 through SF4. In address 2, the second 2×2 pixel data are stored in the order from SF1 through SF4. In the same manner, each pixel data of 2×2 pixels are stored in the order from SF1.

In the configuration in FIG. 4, the OSD image data are previously stored in the first storage unit 21 in the data format as shown in FIG. 5. Namely, in this example, since each pixel data are 8-bit single-color data and the data format at one address is 2×2 pixels for four subframes. Therefore, 32-bit length OSD image data are stored at one address corresponding to subframes. Therefore, unlike the first storage unit 11, the first storage unit 21 doesn't need to have separate storage parts corresponding to each subframe.

A reading unit 22 reads out the OSD image data on an address-to-address basis from the first storage unit 21 when necessary, and controls the controlling unit 24 to load the data at a prescribed address of the load storage unit 23. The data format of the OSD image data stored in the load storing unit 23 is the same as in the first storage unit 21. Therefore, unlike the load storage unit 13 in FIG. 1, the load storage unit 23 doesn't need to have separate storage parts corresponding to each subframe. When the data transmission from the first storage unit 21 to the reading unit 23 and from the reading unit 23 to the load storage unit 23 is performed in parallel, the processing speed can be increased. The controlling unit 24, when OSD image data are loaded into the load storage unit 23, controls the operation of the load storage unit 23 and the address based on the received address signal for designating the subframe.

The controlling unit 24 transmits the OSD image data in the load storage unit 23 to the combining unit 26 based on the address signal for the subframe. In this case, the OSD image data of the subframe SF1 are transmitted from the load storage unit 23 to the storage part corresponding to the subframe SF1 in the combining unit 26. Namely, the load storage unit 23 has a one-on-one relationship with each storage part of the combining unit 26. As one example, the load storage unit has 32 pins consisting of 4×8 pins. Each of the 8 pins are connected to each of the 8 pins of the combining unit 26 having 4×8 pins. Referring to FIG. 5, the 8-bit pins of the load storage unit 23 for output subframe SF1 data are connected to the 8-bit pins of the storage parts corresponding to the subframe SF1 in the combining unit 26, and in the same manner, the 8-bit pins for output subframe SF2 data are connected to the 8-bit pins of the storage parts corresponding to the subframe SF1. When the pins of the load storage unit 23 are connected to the pins corresponding to each subframe in the combining unit 26 and, the controlling unit 24 controls the data transmission of the OSD image data from the load storage unit 23 to the combining unit 25 based on the address signal for designating the subframe, it is possible to transmit the OSD image data corresponding to the image data of each subframe to the four storage parts of the combining unit 26 in parallel. In each storage part of the combining unit 26, the original image data of each subframe transmitted from the second storage unit 25 are combined with the corresponding OSD image data transmitted from the load storage unut 23 based on the address of the corresponding subframe.

According to the embodiment of the present invention, the OSD image data are stored or loaded into the storage unit or the load storage unit that have at least two times the data length of one pixel data at one address so that pixel data of at least two subframes can be stored within one address in a prescribed order. Because of this feature, it is possible to read out in parallel the OSD image data from the storage units. Further, when the data format is set so that the OSD image data of all subframes is stored within one address, the OSD image data of all subframes can be processed simultaneously, the data from the storage unit to the load storage unit can be processed in the same data format as well as in parallel, and data can be transmitted from the load storage unit to the combining unit in parallel. Therefore, it is possible to simplify the configuration of the storage unit, reading unit, load storage unit and the controlling unit and to perform data processing in parallel without complicating the configuration, thereby realizing an image processing apparatus that can process the OSD processing faster and can be configured with lower cost.

Example 3

Figure 6:
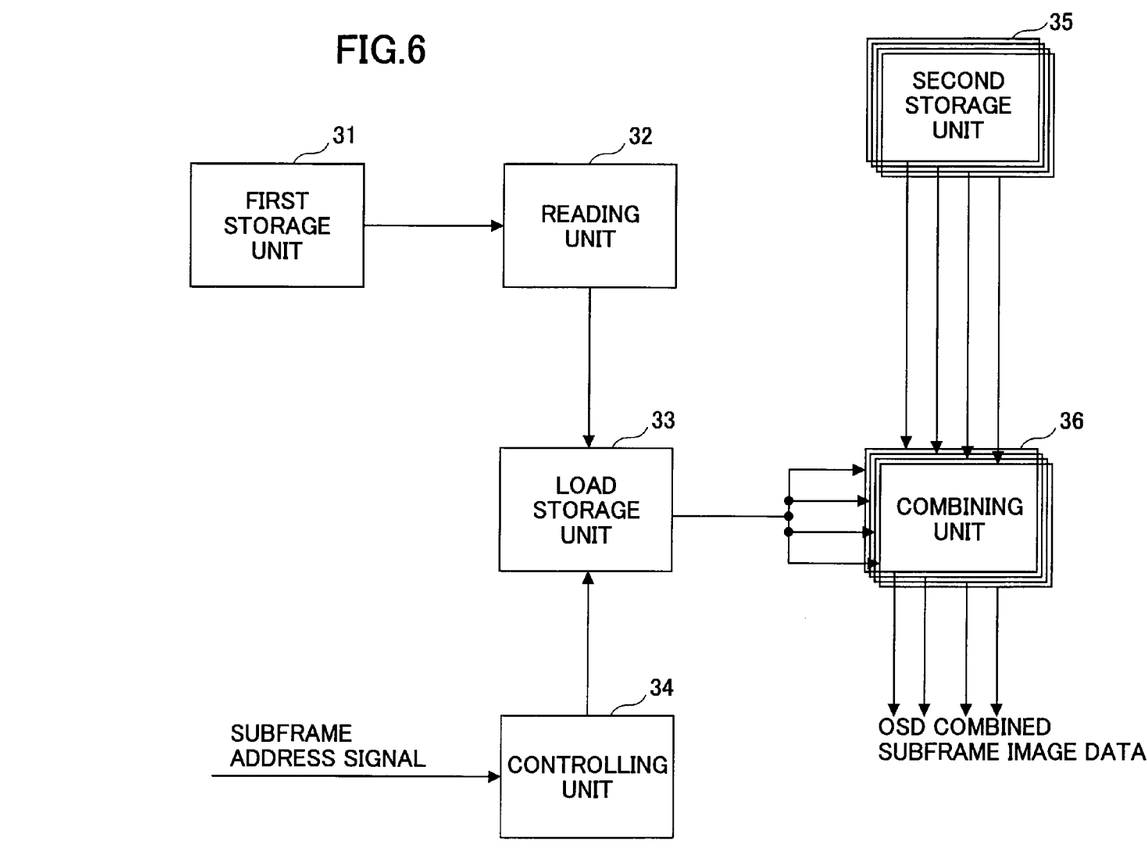
FIG. 6 is a configuration block diagram of an image processing apparatus according to a third embodiment of the present invention.

FIG. 6 is a configuration block diagram of an image processing apparatus according to a third embodiment of the present invention. In this example, by using common OSD image data commonly used in at least two subframes among plural subframes, the storage capacities of a first storage unit 31 and a load storage unit 33 can be reduced.

Figure 7A:
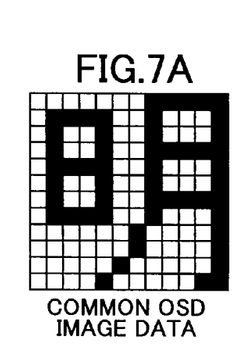
FIG. 7 is a drawing showing one example of the OSD image data used in the second embodiment of the present invention.
Figure 7B:
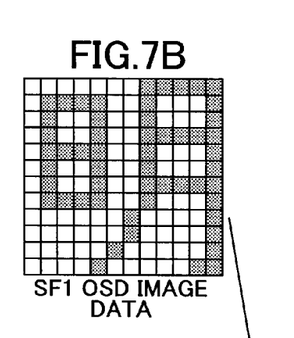
Figure 7C:
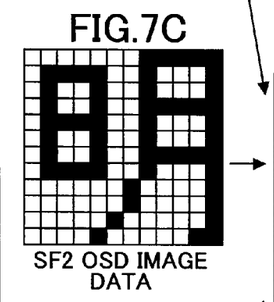
Figure 7D:
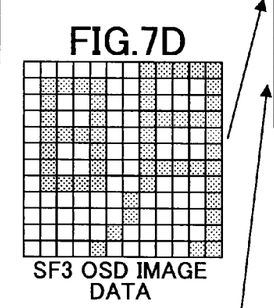
Figure 7E:
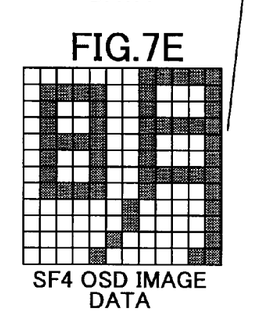
Figure 7F:
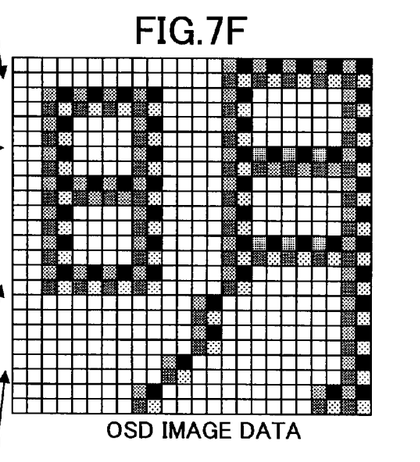

Higher resolution display than that of the image display device can be realized when the image data of one frame is divided into the image data of plural subframes and the divided image data are displayed by time-division display. However, as far as the OSD image data are concerned, it is not always required to realize such higher resolution in actual applications and generally the resolution acceptable in an application is good enough even though the resolution of the OSD image data is lower than the resolution of the original image data. FIG. 7 shows one example of a case where the same OSD image data commonly used for at least two subframes among plural subframes (common OSD image data). In the example, when original image data of one frame are divided into two in both horizontal and vertical directions to create four subframes, the common OSD image data are used for all of the four subframes. In this case, FIG. 7A shows the common OSD image data and FIGS. 7B through 7E show the OSD image data for each subframe. FIG. 7F shows the OSD image data, combining the same OSD data of FIGS. 7B through 7E, which is the same as the OSD image data in FIG. 7A.

In FIG. 6, the common OSD image data are previously stored in a first storage unit 31. A reading unit 32 reads out the common OSD image data from the first storage unit when necessary and controls a controlling unit 34 to load the common OSD image data at the address corresponding to the address of the subframe. The controlling unit 34 controls the address to read and write and the operation of the loading storage 33 based on the address signal for the subframe. The common OSD image data stored in the load storage unit 33 are read out under the control of the controlling unit 34 and transmitted to each of the corresponding parts of the combining unit 36. Namely, in this case, the same OSD image data are sent to each of the four subframes in the combining unit 36. In each part of the combining unit 36, the common OSD image data transmitted from the load storage unit 33 are combined with the original image data of each subframe transmitted from a second storage unit 35, and the combined OSD subframe image data corresponding to the four subframes are output.

According to the embodiment of the present invention, when the same OSD image data previously stored in the storage unit are used in at least two subframes among plural subframes divided from one frame and further when, as shown in FIG. 7, the same common OSD image data previously stored in the storage unit are used for all the subframes, the amount of OSD image data to be processed through the storage unit, the load storage unit, and the combining unit is reduced and the the number of parts to be used is also decreased because, in this example, the number of the subframes is regarded as one. Also the cost is also lowered because the scale of the parts is reduced, thereby realizing an image processing apparatus that can perform the OSD processing faster and can be configured with lower cost.

Example 4

Figure 8:
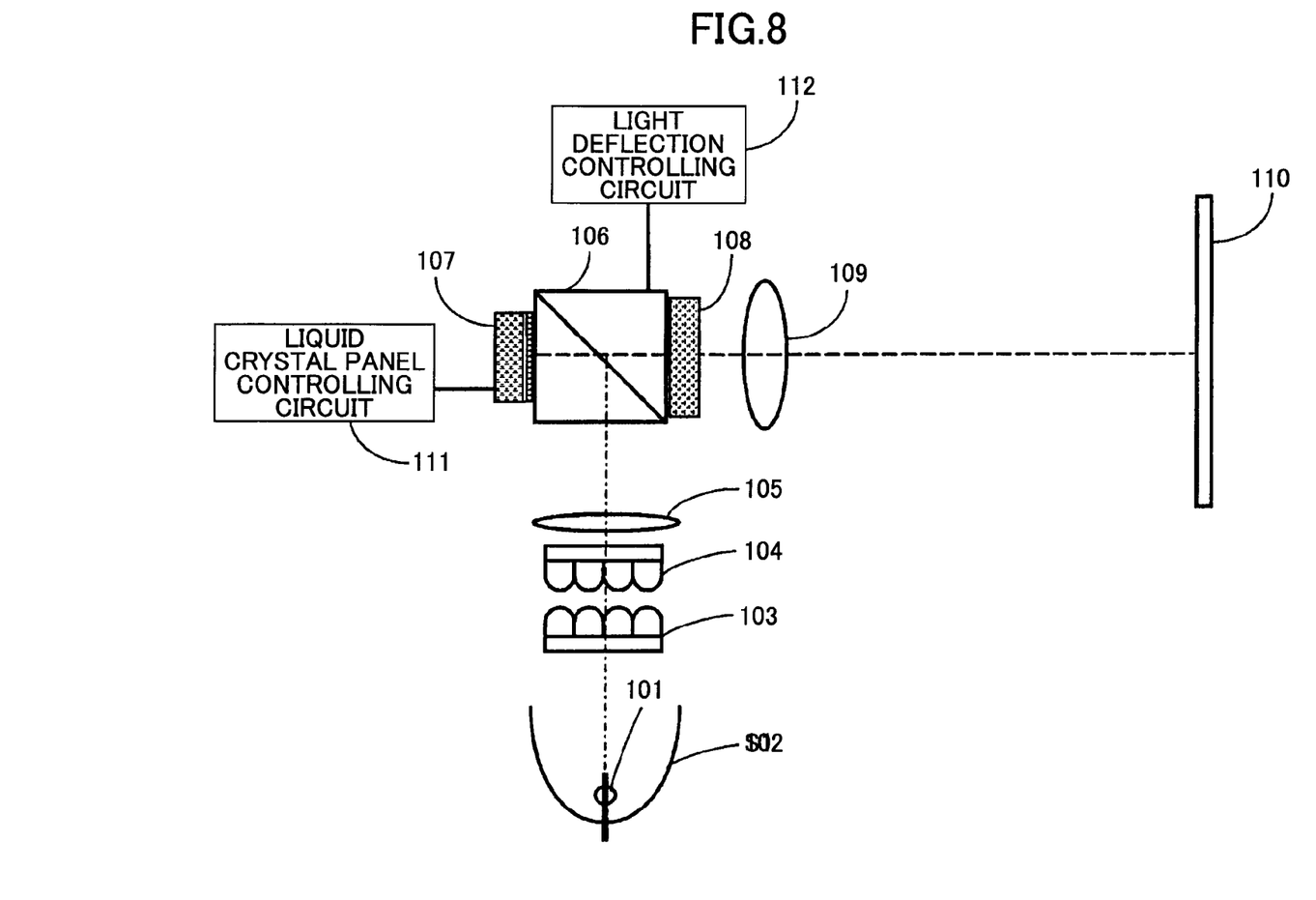
FIG. 8 is a drawing showing an example of an image display apparatus to which an image processing apparatus according to embodiments of the present invention is applied.

As one example of an image display apparatus using the image processing device according to the embodiments of the present invention, FIG. 8 schematically shows an configuration of an image display apparatus capable of displaying higher resolution than the resolution of the image display device used in the image display apparatus, employing a technique in which the image data of one frame are divided in both the horizontal and the vertical directions to create image data of four separate subframes and divided image data are displayed by time-division display. An integrated lighting system, uniforming the light from a light source, includes a light source 101, a paraboloidal reflector 102, and fry-eye lens arrays 103, 104. A condenser lens 105 collect the illumination light through a polarized beam splitter 106 at an image display device 107. The image display device 107 is a reflection-type liquid crystal panel and is controlled by a liquid crystal controlling circuit 111, and displays an image. The displayed images including OSD image data are generated by the image processing apparatus according to the embodiments of the present invention and are displayed at the image display device 107 which is a reflection-type liquid crystal panel under the control of the liquid crystal controlling circuit 111. By a projection lens 109, the images are projected through the polarized beam splitter 106 and a light deflection device 108 and displayed on a screen 110. The polarized beam splitter 106 is used for separating the illumination lights from the image lights. The light deflection device, made of, for example, an optical device, is used for deflecting (shifting) the image light in both the horizontal and the vertical directions to the prescribed amounts with respect to each subframe under the control of a light deflection controlling circuit 112.

The illumination lights emitted from the light source are made uniform by the integrated lighting system and illuminate the image display device 107 through the condenser lens 105 and the polarized beam splitter 106. The illumination lights spatial light modulated by the image display device 107 pass through the beam splitter 106 and input to the light deflection device 108 as the image lights. Then the image lights are deflected (shifted) according to the amount set in the array directions of the pixels by the light deflection device 108. The image lights passed through the light deflection device 108 are enlarged by the projection lens 109 and projected on the screen 110. In this case, the shift amount is set to be half the pitch size of the pixel. One frame is divided into four subframes and the divided image data are operated by the light deflection device 108 with respect to each subframe under the control of the light deflection controlling circuit 112 so that the display position of the image data is deflected (shifted) according to the operation by the light deflection device 108 and the deflected image data is displayed on the screen 110, thereby increasing the apparent resolution of the display.

According to the feature described above, an image display device displaying a higher resolution of image data generated by combining OSD image data and original image data with lower cost can be provided.

The present invention is not limited to the above-mentioned embodiments, and variations and modifications may be made without departing from the scope of the present invention.

The present application is based on and claims the benefit of priority of Japanese patent application No. 2006-250365, filed on Sep. 15, 2006, the entire contents of which are hereby incorporated by reference.

What is claimed is:

1. An image processing apparatus, comprising:
a combining unit configured to combine each of plural subframes of original image data, each divided from one frame, with a corresponding one of plural subframes of OSD image data;
a storage unit configured to store plural subframes of the OSD image data, each of the plural subframes being divided in a same manner as the original image data are divided;
a load storage unit configured to load and store the plural subframes of the OSD image data stored in the storage unit;
a reading unit configured to read out in parallel the plural subframes of the OSD image data stored in the storage unit; and
a controlling unit configured to control loading of the plural subframes of the OSD image data read out in parallel from the storage unit so as to write the OSD image data in parallel in the load storage unit and to read out in parallel the OSD image data from the load storage unit so as to transmit the OSD image data to the combining unit,
wherein the storage capacity per address in the storage unit is equal to or larger than double the data length of one pixel, and accordingly, two or more subframes of the image data are stored according to a prescribed sequence at a single address of the storage unit, and the reading unit is configured to read out the OSD image data in parallel with respect to each address from the storage unit.

2. The image processing apparatus according to claim 1, wherein:
the combining unit is configured to combine a prescribed subframe of the original image data with a corresponding subframe of the OSD image data selected from among plural subframes of the OSD image data, the plural subframes being divided in a same manner as the original image data are divided.

3. The image processing apparatus according to claim 1, wherein:
the storage unit includes at least two divided storage parts corresponding to the corresponding at least two divided subframes.

4. The image processing apparatus according to claim 1, wherein:
the storage capacity per address of the load storage unit is equal to or greater than double the data length of one pixel; and
the controlling unit is configured to write at least two subframes of pixel data at a single address of the load storage unit in parallel and to read out the pixel data in parallel with respect to each address.

5. An image display apparatus, comprising:
an image display device, having a two-dimensional array of pixels and configured to modulate transmitted light or reflected light passing through the image display device by changing the electronic signal input to each of the pixels, the electronic signal being updated at least with respect to each scanning line;
a light source configured to illuminate the image display device;
a deflecting unit configured to deflect the light modulated by the image display device; and
an optical system projecting an image, wherein one frame of image data is divided into plural subframes of the image data and each subframe of the image data is deflected by the deflecting unit so as to be displayed at a corresponding position of the image display device by time-division display, the image display apparatus: further including
the image processing apparatus according to claim 1.

* * * * *